(12) United States Patent
Albou et al.

(10) Patent No.: US 6,976,772 B2
(45) Date of Patent: Dec. 20, 2005

(54) DUAL-FUNCTION LAMP DEVICE FOR A MOTOR VEHICLE

(75) Inventors: Pierre Albou, Bobigny (FR); Joël Leleve, Bobigny (FR)

(73) Assignee: Valeo Vision, Bobigny (FR)

( * ) Notice: Subject to any disclaimer, the term of this patent is extended or adjusted under 35 U.S.C. 154(b) by 134 days.

(21) Appl. No.: 10/425,261

(22) Filed: Apr. 29, 2003

(65) Prior Publication Data

US 2003/0202358 A1    Oct. 30, 2003

(30) Foreign Application Priority Data

Apr. 30, 2002   (FR) ................... 02 05530

(51) Int. Cl.[7] ............................ F21V 11/00; F21V 9/00
(52) U.S. Cl. ...................... 362/510; 362/509; 362/293
(58) Field of Search ................ 362/509, 510, 362/293, 512, 514, 19, 319, 539, 538

(56) References Cited

U.S. PATENT DOCUMENTS

| | | |
|---|---|---|
| 5,525,856 A | 6/1996 | Kawai et al. |
| 6,161,952 A * | 12/2000 | Schuster et al. ............ 362/539 |
| 6,467,940 B2 * | 10/2002 | Eschler et al. ............... 362/510 |
| 2001/0019482 A1 | 9/2001 | Takashi et al. |

FOREIGN PATENT DOCUMENTS

| | | | |
|---|---|---|---|
| DE | 19526023 A1 | 1/1997 | |
| EP | 455524 A1 * | 11/1991 | ............ B60Q 1/00 |
| EP | 479634 A1 * | 4/1992 | ............ B60Q 1/14 |
| EP | 1162401 A | 12/2001 | |

* cited by examiner

*Primary Examiner*—Sandra O'Shea
*Assistant Examiner*—Guiyoung Lee
(74) *Attorney, Agent, or Firm*—Morgan & Finnegan, LLP

(57) ABSTRACT

The object of the invention is a dual-function lamp device for a motor vehicle, comprising in particular a light source emitting light signals towards an output surface of the lamp in order to produce a light beam, and a filtering means which can move between a passive position and an active position in which it allows passage of only some of the light signals corresponding to non-visible wavelengths, the filtering means being used in association with an intermediate lens for modifying the dispersion of the light beam. The driver thus has a direct illumination and an indirect illumination for obtaining, from a single lamp, two different fields of vision.

20 Claims, 2 Drawing Sheets

DUAL-FUNCTION LAMP DEVICE FOR A MOTOR VEHICLE

FIELD OF THE INVENTION

The object of the present invention is a dual-function lamp device for a motor vehicle. Its main aim is to allow a motorist to have, from a single light source, a first light beam and a second light beam which differ in their diffusion area, the first light beam essentially consisting of visible light, and the second light beam consisting of non-visible light, that is to say light waves with wavelengths situated outside the visible spectrum.

BACKGROUND OF THE INVENTION

The field of the invention is, in general terms, that of motor vehicle lamps. In this field, different types of lamp are known, amongst which there are in particular:
   sidelights, of low intensity and range;
   low beam, or dipped beam, headlights, of stronger intensity and with a range on the road close to 70 metres, which are used mainly at night and whose light beam distribution is such that it makes it possible to not dazzle the driver of an oncoming vehicle;
   high beam headlights, and additional long-range or fog light type lights, whose field of vision on the road is close to 200 metres, and which must be switched off when another vehicle is oncoming in order to not dazzle its driver.

Furthermore, certain advanced lamps are known, referred to as dual-mode lamps, which combine the low beam headlight and high beam headlight functions: to that end, there is inside the dual-mode lamp a screen, consisting for example of a removable metal plate, capable of changing on command from a first position in which it does not mask the light signal produced by the light source of the lamp, the range of the lamp then corresponding to that of headlights, to a second position in which it masks part of the light signal produced by the light source of the lamp, the range of the lamp thus being limited to that of low beam headlights.

SUMMARY OF THE INVENTION

The device according to the invention can be installed in any one of the lamp types which have just been mentioned. Its installation will be detailed more particularly, by way of example only, with the high beam headlights.

There are also known, in the prior art, illumination devices, referred to as dual-function lamps, this term designating a lamp having preferably at least one functionality in the visible region and at least one functionality outside the visible region, which make it possible to keep an extended field of vision without dazzling the driver of an oncoming vehicle. Such devices answer the problem according to which it is essential that high beam headlights be switched off in order to hand over to low beam headlights alone when a vehicle is oncoming in order to not dazzle the driver of this vehicle, thus considerably limiting the field of vision at the risk of no longer illuminating any obstacles sufficiently early.

Figure 1:
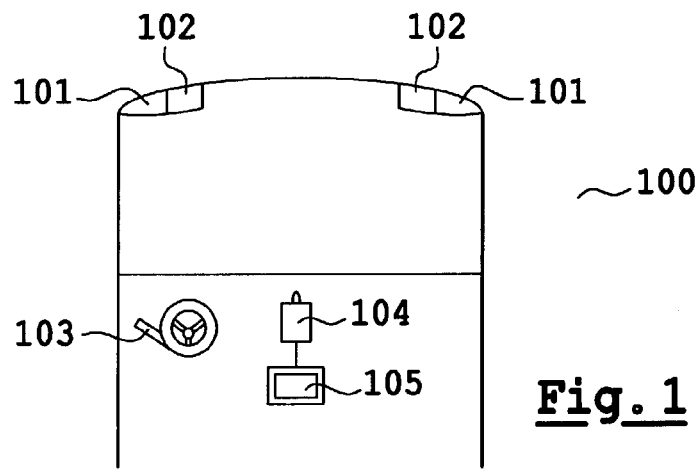
Figure 2:
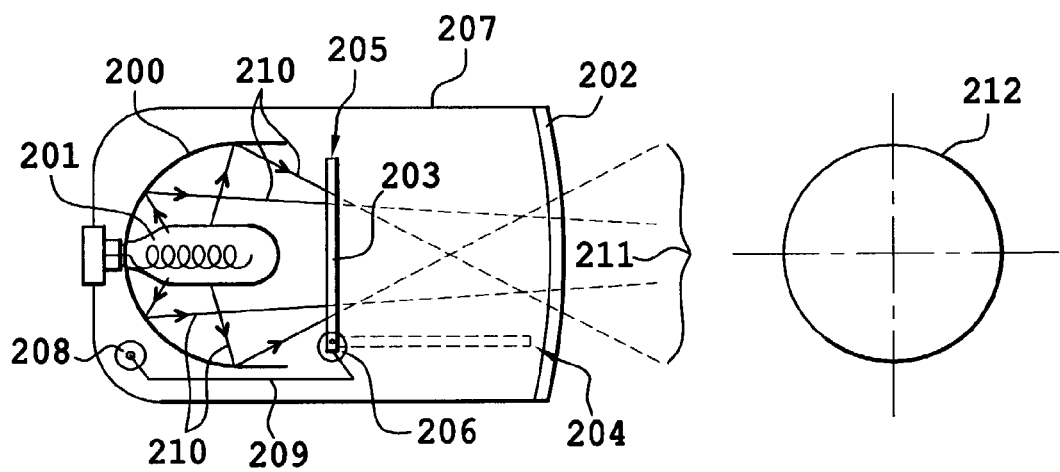

In response to this problem, a device as depicted in FIG. 2 has been proposed, this device being intended to equip vehicles of the type of that illustrated in FIG. 1.

FIG. 1 shows a top view of the front part 100 of a vehicle which has low beam headlights 101, headlights 102 and, in the passenger compartment of the vehicle, a control 103 allowing the low beam headlights or the sidelights to be switched on, and a video camera 104 electrically connected in particular to a display screen 105.

FIG. 2 is a sectional top view of an improved headlight 102. Each headlight comprises essentially a reflector 200, a light source 201, emitting light signals 210, disposed in the vicinity of the tip of the reflector 200, and a light beam output surface 202. The output surface 202 can be either a plastic type glass, or an appropriate lens, referred to as an output lens, for obtaining a light beam satisfying the requirements of the various standards. The definition "light beam" means all the light rays which are actually emitted by a lamp at the output surface 202, the volume illuminated by the light beam corresponding to the field of vision of the driver; "light signals" is the designation for all the light rays emitted by the light source 201. In the prior art, as in the device according to the invention, the light signals 210 are emitted either directly towards the output surface 202, or indirectly after having undergone possible deviations and/or reflections.

An improved headlight such as the one depicted furthermore comprises an infrared filter 203, that is to say a filter allowing the passage of only the light signals whose wavelength belongs to the infrared spectrum. The filter 203 is removable, that is to say it can move between a first position 204, referred to as the passive position, approximately horizontal in the figure, depicted in dotted lines, and a second position 205, referred to as the active position, approximately vertical, depicted in solid lines.

Each filter 203 can be constituted by a plate of rectangular or circular shape capable of pivoting about an axis of rotation 206 attached to a housing 207 in which the headlight 102 is mounted. The pivoting of the filter 203 can for example by controlled by an electric actuator 208 which can drive a system of rods 209 in order to make the filter 203 pivot. In other embodiments, provision can be made, for example, for the removable filter 203 to be constituted by a casing associated for example with a mechanical movement system so that the casing can come to surround the light source 201.

In the first position, none of the light signals emitted by the light source 201 passes through the filter 203, with the result that the visible light makes it possible to illuminate the road. In the second position, the majority of the light signals emitted by the light source 201 passes through the filter 203, with the result that only the infrared signals constitute the output light beam. Some light signals 210 emitted by the light source 201 may however not pass through the filter 203 even when the latter is in the second position, in particular in the case where a hole exists in the reflector 200 to allow the fixing of the light source 201. In the two positions, an identical light beam 211 is obtained. Such a beam projected on a wall would give approximately a circular light patch 212.

In these devices of the prior art, provision is made that, when the driver has activated their headlights and decides to change by means of the control 103 to low beam headlights, the headlights are not switched off, but the filter 203 is put into its active position. The video camera 104, sensitive to infrared rays, makes it possible to obtain an image on the control screen 105, this image corresponding to the field of vision they had by means of the headlights. Furthermore, with the visible light being filtered, the driver of an oncoming vehicle will not be dazzled.

However, in the improved lamp devices of the prior art, the light beam 211 obtained by direct illumination using visible light, or by illumination using non-visible light, referred to as indirect illumination, remains the same. However, in certain cases, it may be useful for the driver to have, with indirect illumination, a light beam different from the one obtained with direct illumination. In the example described previously, it may be of interest to obtain a horizontally broadened indirect illumination since this is advantageous for driving comfort and estimating bends. The light beam is thus made less directional. Another example is that of rear lights, which can be equipped with an improved lamp of the type of that described in FIG. 2, the reflector 200 and the light source 201 being replaced by corresponding elements adapted to rear lights, and for which a different light beam may be required using direct and indirect lighting.

In general terms, the device according to the invention offers a solution so that one or more vehicle lamps can define two light beams, and therefore two different fields of vision: a first field of vision corresponds to an expanse, to a volume, directly visible by the driver by means of illumination with visible light; a second field of vision corresponds to an expanse reconstructed on a control screen from an image of the expanse under consideration illuminated by means of illumination without visible light. The second field of vision can be obtained when the driver no longer wishes to use the visible light of the lights in which the device according to the invention is installed. Thus, in the invention, it is the same light source which makes it possible to obtain two different fields of vision.

In order to achieve this objective, provision has been made, in the invention, for the use of a lens, designated subsequently as the intermediate lens. This lens is disposed inside the lamp so as to receive a significant part of the light signals produced by the light source only when a filter of non-visible light is in the active position, that is to say when this filter no longer allows passage of the light signals which are produced by the light source 201 and which have a wavelength in the visible region. The presence of the lens causes a modification of the paths of the light signals, and consequently changes the dispersion of the light beam. The dispersion of a light beam designates the direction of the light rays defining the outline, the envelope, of the light beam. The physical characteristics of the lens are determined according to the modifications of the paths of the light beams which are desired.

The invention therefore relates essentially to a lamp device, preferably having at least one functionality in the visible region and at least one functionality outside the visible region, for a motor vehicle, comprising at least:
  a light source emitting light signals towards an output surface of the lamp in order to produce a light beam;
  a filtering means capable of moving between a passive position in which it does not substantially intercept the light signals emitted by said source and an active position in which it intercepts the majority, in particular the main part, of the light signals, said filtering means allowing passage of only some of the light signals corresponding to non-visible wavelengths;
  characterised in that the filtering means is used in association with, or forms part of, an intermediate lens for modifying the dispersion of the light beam.

In the meaning of the invention, the fact that the filtering means intercepts "the light signals" emitted by the light source means the signals emitted directly by said source towards the filtering means, but also if applicable the beams emitted by the source and then deviated or reflected, in particular by a reflector, before indirectly reaching the filtering means.

In one particular embodiment, the light source produces a light beam of headlight and/or long-range light type, and/or the use of the filtering means in association with the intermediate lens is implemented automatically as soon as the low beam headlights of the vehicle are activated.

The device according to the invention can also have one or more of the following characteristics:
  the lamp device comprises a second light source able to generate a light beam of low beam headlight, daytime sidelight or fog light type;
  the intermediate lens is disposed so that it receives all or some, in particular the total amount or almost total amount, of the light signals which pass through the filtering means and which have been filtered thereby;
  the structure and disposition of the intermediate lens make it possible to obtain a broadening, or a narrowing, of the light beam, for example in a horizontal direction;
  the intermediate lens is disposed between the light source and the filtering means;
  the intermediate lens is disposed between the filtering means and the output surface;
  the intermediate lens is attached to the filtering means;
  the intermediate lens is a Fresnel lens or is implemented by a plurality of continuous vertical cylindrical lenses of fluted type;
  the light source is a halogen lamp or a discharge lamp;
  the non-visible wavelengths which the filtering means allows to pass belong at least in part to the infrared region, and preferably the near infrared, or the ultraviolet region, and preferably the near ultraviolet;
  the intermediate lens is convergent or divergent;
  the intermediate lens acts optically with a second lens, referred to as the output lens, in order to obtain a broadening of the light beam;
  the output lens, which can be mounted in a fixed manner in the lamp device, is disposed so as to intercept the light signals filtered by the filtering means;
  the lamp device cooperates with an infrared camera and a device for reproducing the image filmed by the camera on a display screen for improved night vision in a motor vehicle.

Figure 3:
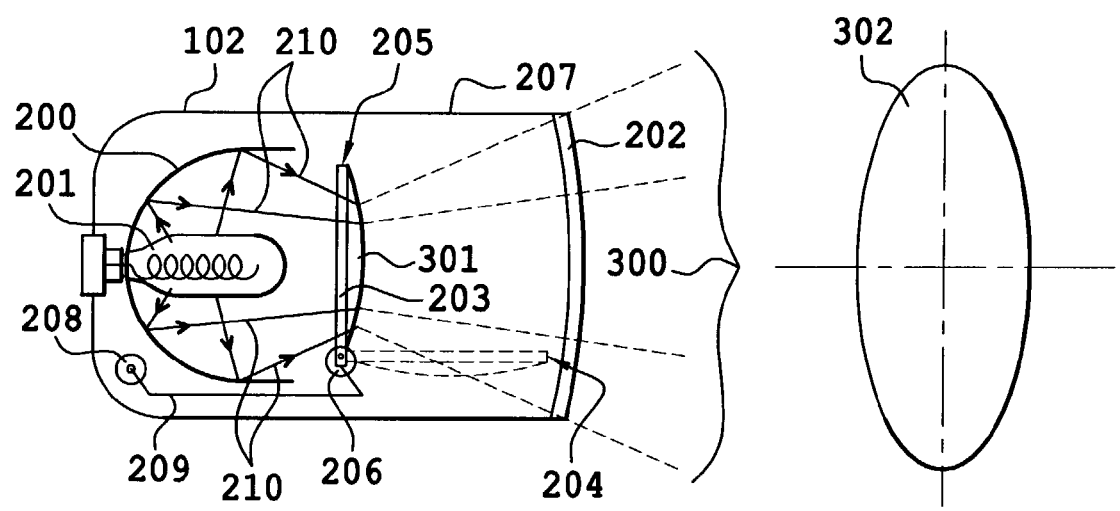
Figure 4:

The invention and its various applications will be better understood from a reading of the following description and an examination of the accompanying figures. These are presented for information only and are in no way limitative of the invention. In particular, the lamp device according to the invention is illustrated in the case of use in a headlight, but this device is suitable for any lamp device of a vehicle. The figures show:

BRIEF DESCRIPTION OF THE DRAWINGS in FIG. 1, already described, a schematic representation of the front face of a vehicle capable of receiving a lamp device according to the invention;
in FIG. 2, already described, an example improved headlight of the prior art;
in FIG. 3, an example embodiment of the device according to the invention in a headlight seen from the top;
in FIG. 4, an illustration of a Fresnel lens.

DESCRIPTION OF THE PREFERRED EMBODIMENTS

FIG. 3 contains again all the elements already present in FIG. 2. The elements common to different figures have kept the same references. According to the invention, the lamp device of FIG. 3 comprises an intermediate lens 301 disposed in a removable manner on the path of at least some of the light signals 210. The presence of the intermediate lens allows the driver to have two distinct light beams 211 and 300. The first light beam 211 is the one which is obtained in the prior art using direct or indirect illumination, that is to say without or with filtering of the light signals 210 by means of the filter 203. The second light beam 300 is, preferably, obtained only using indirect illumination; it is available when the intermediate lens 301 and the filtering means 203 are in an active position, that is to say in the position where on the one hand only the non-visible light signals pass through the filter 203, and where on the other hand some of these signals are deviated by the intermediate lens 301.

The intermediate lens 301 and the filtering means 203 therefore operate simultaneously on the light signals 210: in the case of the headlights 102, when the driver changes to low beam headlights, the filtering means 203 and the intermediate lens 301 automatically come to take up a position on the path of the light signals 210 in order to deviate at least some, possibly all, of them and thus modify the dispersion of the light beam at the output of each headlight 102. The driver thus obtains on their screen 105 an image, using indirect illumination, of an expanse different from the one they were able to see using direct light without the intermediary of the screen.

Although in FIG. 3, given by way of example, the intermediate lens 301 is secured to the filtering means 203, it can, in other embodiments of the device according to the invention, be disposed at other places within the lamp. The various possibilities of location of the intermediate lens can in particular be intermediate positions between the light source 201 and the filtering means 203, or between the filtering means 203 and the output surface 202. The fact of attaching the intermediate lens 301 onto one of the faces of the filtering means 203 makes it possible to avoid the addition of a supplementary mechanism for making the intermediate lens 301 removable. The attachment of the intermediate lens can be performed on the filtering means 203 by gluing, with a heat-resistant glue, or by any other means, in particular mechanical; preferably, the mounting is such that the filtering means 203 and the intermediate lens 301 are placed side by side whilst being able to be detached from one another so as to be able to carry out the replacement of only one of these two components. The intermediate lens 301 can possibly be directly manufactured in the same material as that which constitutes the filtering means so as to form therewith only a single component.

In order to limit the weight of the intermediate lens 301, and thus make the assembly constituted by the filtering means and the intermediate lens less heavy, provision is made, in the device according to the invention, for the possibility of using Fresnel lenses. Such lenses are illustrated in FIG. 4 where a cylindrical lens is depicted in its conventional structure 400, and in its Fresnel form 401. The difference between these two structures is the elimination of a volume 402 in the Fresnel lens, this volume 402 having no optical property. In the Fresnel lens, all the curvatures of the lens are kept, these alone having a real relevance in terms of optical properties.

The position, structural characteristics and physical properties of the intermediate lens within the lamp device according to the invention are chosen so that at least some of the light signals which pass through the intermediate lens 301 are deviated in order to modify the dispersion of the light beam 211 present in the prior art and thus obtain a different light beam 300. For example, cylindrical, convergent or divergent lenses can be chosen depending on the position assigned to them within the lamp device.

Where the output surface 202 is constituted by an output lens of the lamp device, in other words where the output surface has optical properties, the position of the intermediate lens is adapted so that the combination of the two lenses produces the expected modification of the light beam 300. In particular, the following variant embodiments of the device according to the invention can be put in place, with, following the route of the light rays in the direction of emission of the beam leaving the device, either:

the movable intermediate lens, then the movable filtering means, then the fixed output lens (the output lens can form part of the output surface of the lamp, as already mentioned, or be mounted in a fixed manner "before" this output surface, inside the housing 207, so as to be able to intercept the rays filtered by the filtering means);

the movable filtering means, then the movable intermediate lens, then the fixed output lens (it can form part of the output surface or not, as in the preceding variant);

the movable filtering means, then the fixed output lens, then the movable intermediate lens; in this last case, in particular, the output lens does not correspond to the output surface 202, and is disposed inside the housing 207.

In the example illustrated, the light beam 300 is broadened horizontally with respect to the driver. Seen from above, as is the case of FIG. 3, such a beam projected on a wall would give approximately an elliptical light patch 302. Such a modification is particularly advantageous for the driver who can obtain visual information using indirect illumination which was not accessible to them previously. Furthermore, a broadening of the light beam 300 makes it possible to reduce the intensity of the light beam at its centre; with the intensity being better distributed, the camera 104 used will be in a position to provide a better quality image by detailing more precisely the various shades of grey visible on the screen 105.

According to different embodiments, the device according to the invention can be designed with an infrared filtering means 203, that is to say a filter which allows passage of only the light signals whose frequency belongs to the infrared signals spectrum, and preferably only the frequencies of the near infrared which are directly adjacent to the visible frequency spectrum, or with an ultraviolet filter 203, that is to say a filter which allows passage of only the light signals whose frequency belongs to the ultraviolet signals spectrum, and preferably only the frequencies of the near ultraviolet which are directly adjacent to the visible frequency spectrum. In the first case, use will preferably be made of a halogen type light source 201 whereas, in the second case, use will preferably be made of a discharge lamp type light source, one category of which is known by the common name of xenon lamp.

What is claimed is:

1. A lamp device for a motor vehicle, comprising:
   a light source capable of emitting light signals towards an output surface of the lamp device in order to produce a light beam;
   a filtering means capable of moving between a passive position in which the filtering means does not substantially intercept the light signals emitted by said source and an active position in which the filtering means intercepts a majority of the light signals and allows passage of at least a portion of the intercepted light signals corresponding to non-visible wavelengths; and an intermediate lens associated with said filtering means so that, only when said filtering means is in said active position, said intermediate lens modifies a dispersion of the light beam, and wherein said filtering means forms part of said intermediate lens.

2. A lamp device according to claim 1, wherein said light source produces a light beam of a headlight and/or long-range light type.

3. A lamp device according to claim 1, wherein the lamp device comprises a second light source able to generate a light beam of a light selected from the group consisting of: low beam headlight, daytime sidelight or fog light type.

4. A lamp device according to claim 1, wherein the use of the filtering means in association with the intermediate lens is implemented automatically as soon as the low beam headlights of the vehicle are activated.

5. A lamp device according to claim 1, wherein the intermediate lens is disposed so that it receives all or some of the light signals which pass through the filtering means and which have been filtered away.

6. A lamp device according to claim 1, wherein the structure and disposition of the intermediate lens make it possible to obtain a broadening of the light beam.

7. A lamp device according to claim 6, wherein the broadening of the light beam is produced in a horizontal direction.

8. A lamp device according to claim 1, wherein the intermediate lens is disposed between the light source and the filtering means.

9. A lamp device according to claim 1, wherein the intermediate lens is disposed between the filtering means and the output surface.

10. A lamp device according to claim 1, wherein the intermediate lens is attached to the filter means.

11. A lamp device according to claim 1, wherein the intermediate lens is a Fresnel lens or is implemented by a plurality of continuous vertical cylindrical lenses of fluted type.

12. A lamp device according to claim 1, wherein the light source is a halogen lamp.

13. A lamp device according to claim 1, wherein the light source is a discharge lamp.

14. A lamp device according to claim 1, wherein the non-visible wavelengths which the filtering means allows to pass belong at least in part to the infrared region.

15. A lamp device according to claim 1, wherein the non-visible wavelengths which the filtering means allows to pass belong at least in part to the ultraviolet region.

16. A lamp device according to claim 1, wherein the intermediate lens is convergent-or divergent.

17. A lamp device according to claim 1, wherein the intermediate lens acts optically with a second lens, referred to as the output lens, in order to obtain a broadening of the light beam.

18. A lamp device according to claim 17, wherein the output lens is disposed so as to intercept the light signals filtered by the filtering means.

19. A lamp device according to claim 17, wherein the output lens is mounted in a fixed manner in the lamp device.

20. A lamp device according to claim 1, which cooperates with an infrared camera and a device for reproducing the image filmed by the camera on a display screen for improved night vision in a motor vehicle.

* * * * *